United States Patent [19]
Ott

[11] 4,387,406
[45] Jun. 7, 1983

[54] ENCODING AND DECODING DIGITAL DATA IN A VIDEO FORMAT

[75] Inventor: Granville E. Ott, Lubbock, Tex.

[73] Assignee: Texas Instruments Incorporated, Dallas, Tex.

[21] Appl. No.: 202,541

[22] Filed: Oct. 31, 1980

[51] Int. Cl.³ .............................................. H04N 9/00
[52] U.S. Cl. ...................................... 358/310; 375/25
[58] Field of Search .................... 358/4, 310; 375/25, 375/37

[56] References Cited
U.S. PATENT DOCUMENTS
4,275,411  6/1981  Lippel ..................................... 358/4

Primary Examiner—Alan Faber
Attorney, Agent, or Firm—Robert D. Marshall, Jr.; Leo N. Heiting; Melvin Sharp

[57] ABSTRACT

A technique for storing and transmitting digital data in a video format includes use of chrominance and luminance portions of a video signal for transmitting data and timing information. The data is encoded according to a predetermined set of chrominance signals corresponding to a predetermined set of colors. Timing information is conveyed by a change in the luminance or brightness of the video signal. A predetermined brightness level transition determines when the chrominance signal should be decoded in order to determine which of the plurality of colors is indicated. The use of the luminance signal to transmit timing information enables the use of a decoding circuit having a relatively simple structure. In one preferred embodiment, two predetermined colors are employed to indicate either a digital one or a digital zero. It is further preferred that a frame border of a predetermined non-encoded color surround each frame of encoded color signals in order to reduce the noise sensitivity of the system during both horizontal and vertical retrace. Video signals encoded in this manner may be stored in video cassette recordings or video disk recordings or may be transmitted in the manner of ordinary television signals.

27 Claims, 12 Drawing Figures

ENCODING AND DECODING DIGITAL DATA IN A VIDEO FORMAT

BACKGROUND OF THE INVENTION

Central to the usefulness of computers is the ability to transmit and store large amounts of data. Recent developments in the area of video products has produced two separate systems for storing video signals. Both video cassette recorders and video disk players are now commercially available as consumer products in the U.S. Because each of these systems enables storage of video signals corresponding to 60 frames, or complete pictures, per second of video viewing time, and remembering the old adage that one picture is worth a thousand words, it can be readily appreciated that these systems enable storage of an enormous amount of data. The vast storage capacity permitted by these video systems is highly attractive if this storage capacity can be easily employed in computing applications. Due to the complex timing requirements of the raster-scanned video signals stored in these video storage media, generation and reception of data signals encoded in a form acceptable by these video storage media are complex tasks.

At present, there exists numerous low-cost, limited capacity computers which have the capability of generating color graphics. These computers could be employed with proper programming to generate composite video signals compatible with these video storage media for storing data if an appropriate encoding/decoding scheme could be developed. On the other hand, no such conveniently available equipment exists for readily decoding data stored in a video format for use by a computing system. It would be especially useful if such a system could be developed which would employ a minimum amount of timing circuitry, thereby reducing the cost and complexity of this system.

OBJECTS OF THE INVENTION

It is an object of the present invention to provide a scheme for encoding and decoding digital data into a video format for storage and transmission as a video signal.

It is another object of the present invention to provide such an encoding and decoding scheme in which the luminance portion of a video signal is employed to indicate timing information and the chrominance portion of a video signal is employed to indicate data.

It is another object of the present invention to provide an encoding and decoding scheme such as described above in which the time of a transition of the luminance portion of the video signal from a first brightness level to a second brightness level imparts timing information, this timing information being employed to determine when to detect the color value of the chrominance portion of the video signal, this color value being indicative of the data encoded.

A still further object of the present invention is to encode digital data in the manner related above and further to generate a composite video signal including the thus generated luminance portion and chrominance portion, this composite video signal employed for transmission and later reception of digital data or for storage and retrieval of this digital data.

It is a still further object of the present invention to encode digital data into a composite video signal in the manner described above, in which the composite video signal includes a plurality of video frames having a predetermined border color distinguished from the signal carrying portion of the composite video signal, this border color being employed to reduce the decoding noise sensitivity and sync signal interference during horizontal and vertical retrace portions of the composite video signal.

BRIEF DESCRIPTION OF THE DRAWINGS

These and other objects of the present invention will become clear from the foregoing detailed description of the invention taken in conjunction with the drawings in which.

DETAILED DESCRIPTION OF THE INVENTION

The encoding scheme of the present invention employs two separate aspects of a video signal. Data is encoded by selecting predetermined colors, as indicated by the luminance portion of the video signal, to indicate the data. A simple encoding scheme would have a first color, such as red, indicating a digital zero and a second color, such as blue, indicating a digital one. It is theoretically possible to employ a scheme in which each individual color dot in the picture represented by the video signal has a red luminance value of a blue luminance value for defining the state of one bit per picture element. However, such a scheme would require the decoding apparatus to have a clock in synchronism with the encoding clock for distinguishing each individual picture element from the others. The timing system for a such an application would be rather complex and expensive. The present invention overcomes this requirement for a complex and expensive clock in the decoding system by including timing information in the video signal. In exchange for a lower encoding density, that is a lower rate of data transmission, the present invention includes a timing signal which indicates when the chrominance signal should be detected during decoding. This timing information is transmitted by a change from a first predetermined brightness to a second predetermined brightness in the luminance portion of the video signal. The detection of this change in luminance signal would enable a decoder to determine the correct time for detecting the chrominance value of the chrominance portion of the signal, thereby determining the digital data encoded. According to the present invention, the brightness transition corresponding to a change in luminance value from a first predetermined luminance value to a second predetermined luminance value in the luminance signal is accompanied by a simultaneous change in the chrominance value from a first predetermined chrominance value indicative of a particular data state to a second predetermined chrominance value in the chrominance signal.

Figure 1:
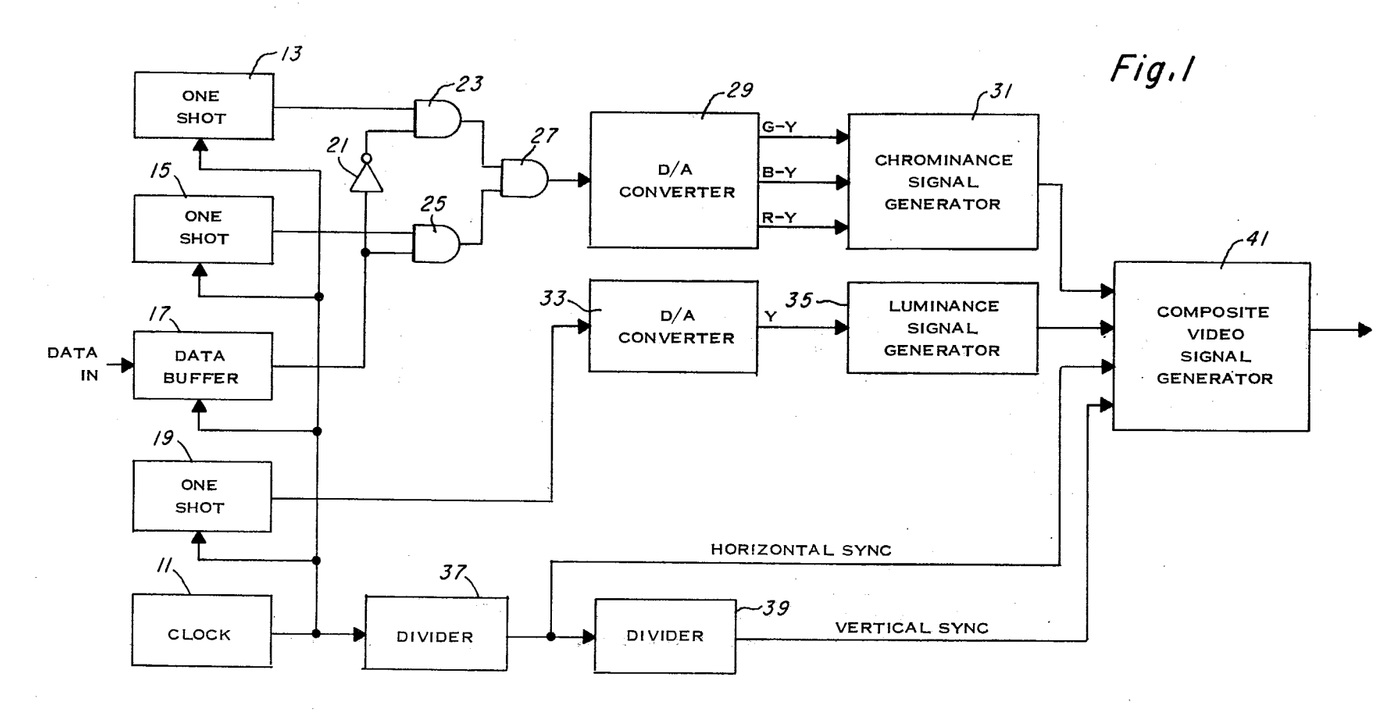
FIG. 1 illustrates an encoding apparatus according to the present invention.

FIG. 1 illustrates an apparatus for encoding digital data in the format of the present invention. Digital data is applied to the apparatus of FIG. 1 by way of data buffer 17. Clock 11 produces a series of clock pulses for controlling the timing operation of this apparatus. The clock signals are applied directly to one shot 13, one shot 15, data buffer 17, one shot 19 and divider 37. Data is entered into data buffer 17 one bit at a time and its application to the apparatus is controlled by signals from clock 11. Simultaneous with the transfer of data out of data buffer 17, both one shot 13 and one shot 15 are enabled. The signals from one shot 13 and 15 are applied to AND gates 23 and 25, respectively. The output of data buffer 17 is applied directly to an additional input of AND gate 25 and is further applied to an additional input of AND gate 23 through inverter 21. The output of data buffer 17 is one bit of the input data applied to the apparatus, therefore this output has either a "zero" state or a "one" state. One shots 13 and 15 generate momentary digital signals of the opposite polarity when triggered by clock 11. A "zero" state from data buffer 17 enables the signal from one shot to be applied to D to A converter 29 via AND gates 23 and 27. Similarly, a "one" output from data buffer 17 permits the output signal from one shot 15 to be applied to D to A converter 29 via AND gates 25 and 27. D to A converter 29 converts the digital signals received from and gate 27 into color difference signals (G−Y, B−Y, and R−Y) corresponding to two colors. Thus if the data in data buffer 17 is in the "zero" state, D to A converter 29 produces the color difference signals corresponding to the two colors in a first order, controlled by one shot 13, and if the data in data buffer 17 is of the "one" state these color difference signals represent the colors in the opposite order as controlled by one shot 15. These color difference signals are applied through chrominance signal generator 31 which generates a chrominance signal according to known techniques. At the same time that the chrominance signal is generated as described above, a luminance signal is generated by one shot 19, D to A converter 33 and luminance signal generator 35. One shot 19 is triggered by clock 11 at the same time as one shots 13 and 15 and data buffer 17 are enabled. It applies a momentary digital signal to D to A converter 33 which represents the transition from a first brightness level to a second brightness level. D to A converter 33 converts this momentary digital signal into a luminance value signal Y which is applied to luminance signal generator 35. The luminance signal including a change from a first to a second brightness level occurring simultaneously with the color change in the chrominance signal is applied to composite video signal generator 41. Composite video signal 41 also has horizontal and vertical synchronization signals applied to it from the divider chain including divider 37 and divider 39. Divider 37 derives the horizontal synchronization signals from clock 11 by dividing the clock frequency. Similarly, the vertical synchronization signal is obtained by further dividing the horizontal synchronization signal via divider 39. These synchronization signals are employed to control the horizontal retrace and vertical retrace signals generated by composite video signal generator in a manner well known in the art.

Figure 2:
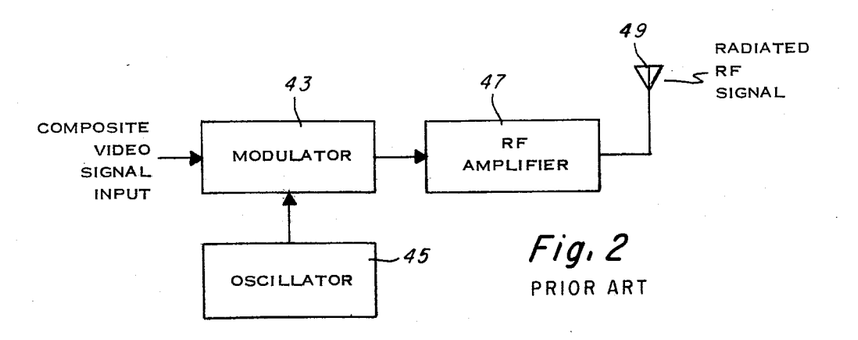
FIG. 2 illustrates a prior art apparatus for transmitting a composite video signal.

FIG. 2 illustrates a known device for transmitting a composite video signal, such as the composite video signal generated by the apparatus of FIG. 1, as radio frequency waves. The composite video signal is applied to modulator 43 along with an oscillator signal from oscillator 45. The signal from oscillator 45 is modulated according to the composite video signal and the modulated signal is applied to RF amplifier 47. RF amplifier 47 amplifies this signal and applies it to antenna 49 which radiates this signal as radio waves. The radio wave signal can then be received by a properly tuned receiver.

Figure 3:
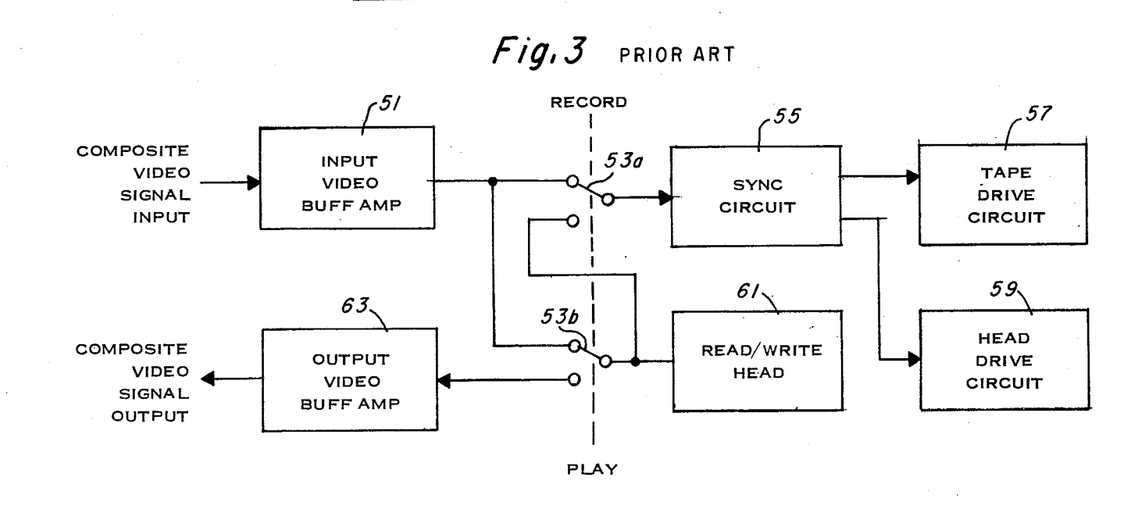
FIG. 3 illustrates a prior art apparatus for storing a video composite signal.

FIG. 3 illustrates the block diagram of a video tape recorder which may be employed to store video signals such as the composite video signal generated by the apparatus illustrated in FIG. 1. The composite video signal is applied as an input to input video buffer amplifier 51. The output of input video buffer amplifier is applied to both section 53a and 53b of record/play switch 53. In the record mode, the output of input video buffer amplifier is applied to sync circuit 55 which thereby generates the necessary signals for controlling tape drive circuit 57 and head drive circuit 59. Tape drive circuit 57 controls the movement of the magnetic tape during record and play operations. Similarly, head drive circuit 59 controls the movement of a rotary tape head (read/write head 61) during record and play operations. The signals applied to these drive circuits from sync circuit 55 are derived from the horizontal and vertical synchronization signals which form a part of the composite video signal. In addition, also during record operations, the output of input buffer amplifier is applied through record/play switch section 53b to read/write head 61 for altering the magnetic state of the magnetic tape according to the composite video signal. During play operations, the magnetic state of the tape is read by read/write head 61 and applied as an inut to output video buffer amplifier 63. The output of output video buffer amplifier 63 corresponds to the composite video signal previously stored on the magnetic tape. In addition, the output of read/write head 61 is applied to sync circuit 55 through record/play switch section 53a. Thus the horizontal and vertical synchronization signals stored on the magnetic tape as part of the composite video signal can be analyzed by sync circuit 55 to provide the proper control signals to tape drive circuit 57 and head drive circuit 59.

Figure 4:
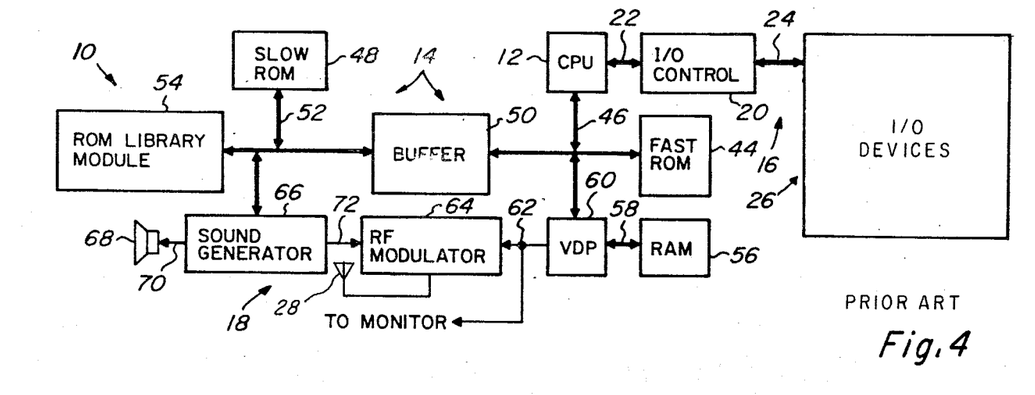
FIG. 4 illustrates a prior art digital computing system which may be employed to generate and transmit a composite video signal according to the present invention.
Figure 5:
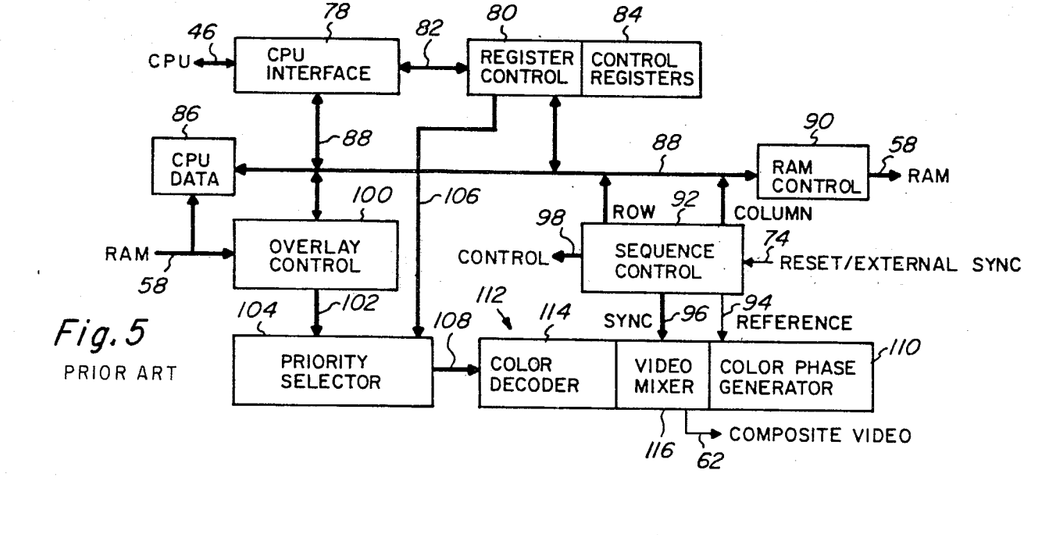
FIG. 5 illustrates details of the video display processor portion of the digital computing system illustrated in FIG. 4.

FIG. 4 illustrates an example of a prior art small digital computing system having the capacity to generate color graphic signals in the form of composite video signals or in the form of RF signals for reception via a standard television receiver. The particular digital computing system illustrated in FIGS. 4 and 5 is more fully described in the following U.S. patents, assigned to the assignee of the present invention: "Video Display Processor Having Integral Composite Video Generator", U.S. Pat. No. 4,243,984 by Joe F. Sexton; "Video Display Processor", Ser. No. 18,540, filed Mar. 8, 1979 by David A. Ackley et al; and "Digital Computing System Having Auto-Incrementing Memory", U.S. Pat. No. 4,286,320 by Granville E. Ott.

In general, the digital computing system 10 illustrated in FIG. 4 is composed of a central processing unit (CPU) 12, a memory subsystem 14, and input/output subsystem 16, and a video display subsystem 18. The CPU 12, which may be a monolithic microprocessor such as the Texas Instruments 9995 operates in a conventional manner under the control of digital control programs stored in the memory subsystem 14, usually in response to processing requests initiated via the input/output subsystem 16. In the input/output subsystem 16, an I/O controller unit 20, which may be a monolithic integrated circuit such as Texas Instruments 9901, operates in a conventional manner to interface a CPU communication bus 22 to an I/O bus 24 connected to one or more I/O devices 26.

In the memory subsystem 14, it is frequently desirable to combine a quantity read only memory (ROM) with a quantity of read/write, random access memory (RAM). In such a configuration support programs such as a suitable operating system and a desired assembler or compiler are stored in the ROM while user programs and volatile data are stored in the RAM. In such form, the relatively static program and data are maintained in the relatively less expensive ROM, so that only the relatively transient programs and data need be stored in the generally more expensive RAM. The memory subsystem 14 is also configured to take advantage of the low cost of relatively slow ROM and of dynamic RAM, without substantially degrading the performance of the CPU 12. More particularly, in the ROM portion of the memory subsystem 14, a relatively limited amount of fast ROM 44, particularly of the N-channel MOS type, such as the Texas Instruments 4732, is larger amount of relatively slow ROM 48 preferably of the P-channel MOS type, such as the Texas Instruments 0430, is connected to the CPU 12 via a bus buffer 50, such as the Texas Instruments 74LS245, interposed between the CPU memory bus 46 and an auxiliary bus 52. By providing each devide comprising slow ROM 48 with an integral auto-incrementing address counter, the CPU overhead associated with sequentially accessing the slow ROM 48 is greatly reduced. If, in addition, each of the devices comprising the slow ROM 48 is assigned a unique ROM address page number, as in the 0430, an additional plurality of such devices may be incorporated to form a ROM library module 54 for connection to the auxiliary bus 52 via a suitable plug-in type port.

In the RAM portion of the memory subsystem 14, a block of dynamic RAM 56, preferably of the N-channel MOS type, such as the Texas Instruments 4027, is connected via a RAM bus 58 to the CPU memory bus 46 via a video display processor (VDP) 60. More particulary, the VDP 60 is constructed to provide, in addition to other functions to be described below, an auto-incrementing address counter capability, similar to that incorporated in the devices comprising the slow ROM 48. In addition, the VDP 60 provides for the periodic refreshing of the contents of the various devices comprising the RAM 56. Thus, the CPU 12 is relieved of the burden of supplying addresses for each of a series of sequential accesses to the RAM 56, and of the considerable overhead normally associated with the periodic refreshing of dynamic random access memory.

In the video display subsystem 18, the VDP 60 may be activated by the CPU 12 via the CPU memory bus 46 to generate all video, control and synchronization signals necessary for the display on a raster-scanned television unit of a set of display data previously generated by the CPU 12 and stored in the RAM 56. The resultant composite video signal is provided via a signal path 62 for application either to a dedicated monitor unit or to a conventional RF modulator 64 before application to an antenna 28. A sound generator 66, such as the Texas Instruments 9919, is connected to the CPU 12 via the auxiliary bus 52 and provides a CPU-controlled audio signal which may be applied to an auxiliary speaker 68 via a signal path 70 or to the RF modulator 64 via a signal path 72 for mixing with the composite video signal provided by the VDP 60.

Shown in FIG. 5 is a block diagram of the circuit comprising the video display processor 60 shown in FIG. 4. In general, the VDP 60 is constructed to operate in both a RAM controller mode and in a video controller mode, with substantial simultaneity occurring between these modes. In addition, much of the crcuitry for accomplishing the RAM controller functions may be conveniently employed, together with additional circuitry, for accomplishing the video controller functions. In this manner, substantial savings in time and circuitry are realized.

In the video controller mode, the VDP 60 generates a composite video signal in accordance with a set of control parameters established in the control registers 84, using a set of display data arrays stored in the RAM 56. In general, the composite video signal, when displayed on a suitable video display unit, produces a video display comprised of M columns of N rows of individual, discrete video display elements or pixels. For convenience of information display, however, the $(M \times N)$ pixels may be considered as being logically associated into smaller contiguous groups or blocks which may be configured or defined to form discernible characters or "patterns," as in conventional character generators. In addition, however, the VDP 60 may also accomodate a plurality of mobile blocks or "sprites" which may be freely moved relative to the fixed display image by defining or selecting a particular column U and row V at which the upper left corner of the sprite is to be displayed. Thus, VDP 60 generates the composite video signal in synchronization with the instantaneous column X and row Y position of the raster scan so as to display either the fixed patterns or the mobile sprites, as appropriate.

In the preferred form, the VDP 60 operates in a CPU-selected pattern graphics video display mode. Briefly, in the pattern graphics mode, the VDP 60 generates a 32 column, 24 row image of patterns ($8 \times 8$ pixels) selected from a pattern generator table (256 pattern definition blocks) according to a pattern name table (768 pattern names), and, in addition, superimposes a number of sprites ($8 \times 8$ pixels) selected from a sprite generator table according to a sprite name table which also defines the displacement of each sprite relative to the pattern image. In the pattern graphics video display mode, the VDP 60 provides a selection of distinct colors.

During system initialization and as required thereafter, the VDP 60, operating in the memory controller mode, cooperates with the CPU 12 to establish in the RAM 56 the various display data arrays. To enable the VDP 60 to operate in the pattern graphics mode, the CPU 12 should store in the RAM 56 the various pattern tables relied upon by the VDP 60. In particular, the pattern generator table is comprised plurality of consecutive pattern definition blocks, each consisting 8, 8-bit bytes, which define the bit patterns for each individual pattern, as in conventional character generators. In contrast, the pattern name table consists of a row-by-column ordered array of pattern names which map the pattern definition blocks into each of the 32 columns of 24 rows of patterns comprising a full screen video pattern image. In addition, a pattern color table establishes a set of video color codes associated with each of 32 contiguous sets of 8 pattern definition blocks of the pattern generator table, with each of the video color codes corresponding to a particular one of the available colors. Thus, the pattern generator table, and the pattern color table represent an ordered array whereby the individual bits comprising a pattern definition block map the video color codes assigned via the pattern color table into each of the M columns of N rows of pixels comprising a full screen video pattern image.

In general, a sequence control 92 operates in a conventional manner to maintain a cyclic column count X and a cyclic row count Y indicative of the time sequential position of the raster scan of the video display unit. As will be clear to those skilled in the art, only a portion of the total raster scan period is devoted to actively displaying patterns on the video display unit, since a portion of each row of horizontal scan is devoted to horizontal retrace, while a number of complete rows of horizontal scans are required to perform vertical retrace and related synchronization. However, at least during the active display period, the sequence control 92 makes the column count X and the row count Y available via the VDP address and data bus 88. The sequence control 92 also provides a color reference signal having a frequency related to the NTSC 3.57 MHz carrier, via a signal path 94, and a set of sync signals of substantially conventional form via a sync bus 96. In the preferred form, the sequence control 92 is comprised of a clock circuit of conventional form, and a pair of control programmable logic arrays (PLA's) for providing a various control signals via a control bus 98 depending on the current column and row counts.

An overlay control 100, responsive to the column and row counts, periodically requests the RAM control 90 to retrieve selected portions of the pattern and sprite tables from the RAM 56. As the display data is provided by the RAM 56 via the RAM bus 58, the overlay control 100 receives the pattern data, and provides a first pattern signal via a pattern bus 102, comprising the bit in the pattern generator table which maps the pixel in the column $(X-U+1)$ of the row $(Y-V+1)$ of the video sprite image when $U \leq X \leq (U+S)$ and $V \leq Y \leq (V+T)$. In addition, the overlay control 100 receives the video color codes assigned to each pattern and sprite during the display thereof. In other words, the overlay control 100 processes the pattern data arrays so as to provide the proper bit patterns for each of the selected patterns during the entire period that the display is active, but processes the sprite data arrays so as to provide the proper bit patterns for each of the selected sprites only during that portion of the active display period specified for the display thereof.

Each of the first and second pattern signals, and the associated video color codes, are applied to a priority selector 104 via the pattern bus 102. In response to receiving only the first pattern signal, the priority selector 104 will select a respective one of the video color codes associated with the first pattern signal, depending upon the current digital value thereof. On the other hand, in response to receiving the second pattern signal, whether or not the first pattern signal is also being received, the priority selector 104 will select the video color code associated with the second pattern signal. If neither the first nor second pattern signals is being received, the priority selector 104 will generally select a default video color code provided by one of the control registers 84 via a default color bus 106. If, as in the preferred form, the overlay control 100 provides a second pattern signal for each of a plurality of active sprites, the priority selector 104 will select the second pattern signal corresponding to the sprite image having the highest priority, according to a predetermined prioritized ordering of the available sprite images. In each case, the video color code corresponding to the current selected pattern signal is provided via a color bus 108 as a video control signal.

A color phase generator 110, which forms a portion of a composite video generator 112, receives the color reference signal provided by the sequence control 92 via signal path 94, and generates the six NTSC color phase signals, each phase shifted by a predetermined amount relative to the color reference signal. In a color decoder 114, the video color codes, comprising the video control signal provided by priority selector 104 via the color bus 108, are decoded, and applied to a video mixer 116, together with the color phase signals provided by the color phase generator 110. In the video mixer 116, each of the video color codes decoded via the color decoder 114 selectively couples a complimentary pair of the color phase signals to a gating network (described hereinafter) to generate the information portion of a composite video signal for output via the signal path 61. In addition, the video mixer 116 receives the sync signals provided by the sequence control 92 via the sync bus 96, and generates the standard horizontal, vertical and color burst portions of the composite video signal in response thereto.

Figure 10:
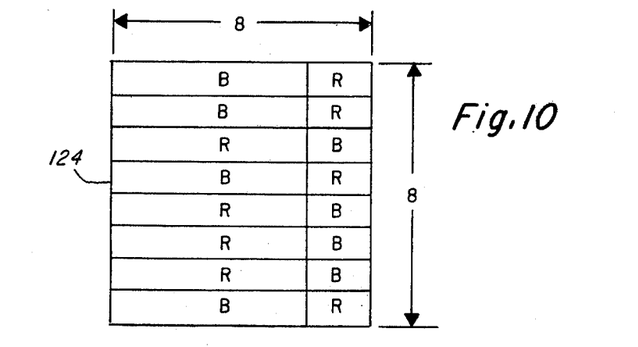
FIG. 10 illustrates an encoded pixel according to the present invention.
Figure 11:
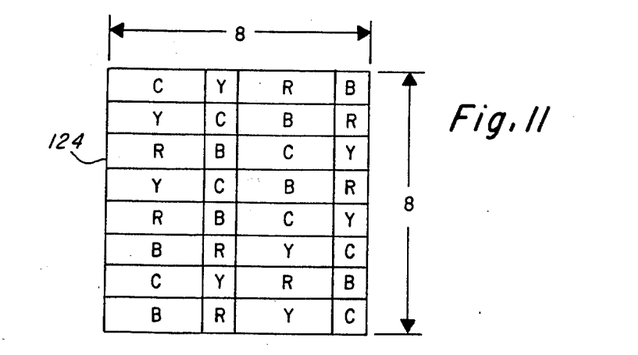
FIG. 11 illustrates an encoded pixel according to another aspect of the present invention.

The computing system illustrated in FIGS. 4 and 5 and described above can be employed to generate a composite video signal having digital data encoded thereon in the manner of the present invention. Digital data is applied to the computing system from one of the I/O devices 26 via I/O bus 24 to I/O controller 20. This data is then applied to CPU 12 via CPU communication bus 22. A data conversion program, which may be stored in one of the ROM library modules 54, enables CPU 12 to convert the incoming data from the I/O device into the information necessary for production of individual 8×8 pixels such as illustrated in FIGS. 10 and 11. This data is applied to VDP 60 via CPU memory bus 46. The VDP 60 stores this pixel generation data in the pattern generator table and the pattern name table within RAM 56. Once this data is stored in the proper locations within RAM 56, VDP 60 cooperates with RAM 56 via RAM bus 56 to generate a composite video signal having the data from the I/O device 26 encoded therein.

Figure 6:
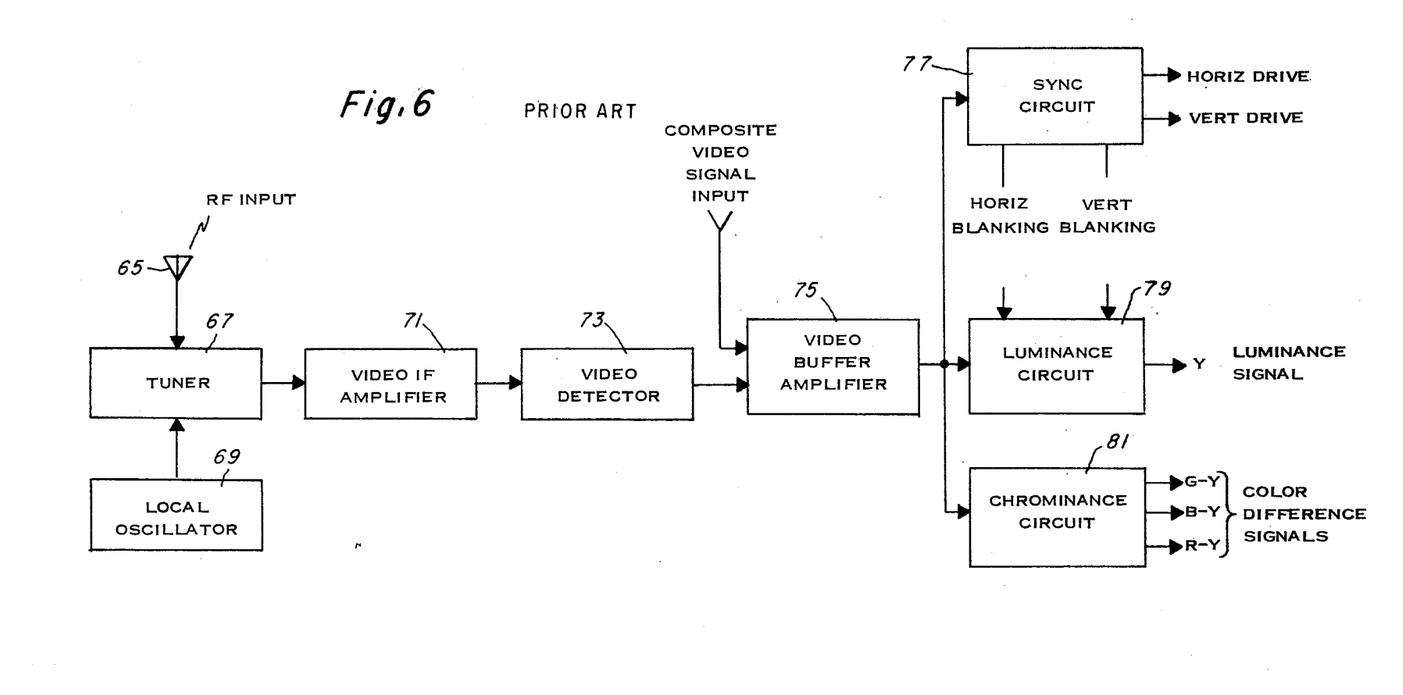
FIG. 6 illustrates a prior art apparatus for receiving transmitted composite video signals and generating a luminance signal and a set of color difference signals.

FIG. 6 illustrates the typical construction of a color television receiver which may be employed in receiving transmitted composite video signals having digital information contained therein encoded according to the present invention. In addition, FIG. 6 illustrates the color processing which may be employed to generate the luminance and chrominance signals from the composite video signal. The transmitted RF signal is received via antenna 65 and applied to tuner 67. Tuner 67 also receives a signal from local oscillator 69 and generates an intermediate frequency signal which is applied to video IF amplifier 71. Video IF amplifier 71 applies an amplified video intermediate frequency signal to video detector 73. Video detector 73 generates a composite video signal which corresponds to the received RF signal. This composite video signal is applied to video buffer amplifier 75. In applications in which a composite video signal is received directly, such as from the video tape recorder illustrated in FIG. 3, this composite video input signal is applied directly to video buffer amplifier 75. Video buffer amplifier 75 applies the composite video signal to three circuits, each of which extracts different portions of the information contained in the composite video signal. Sync circuit 77 derives synchronization information from the composite video signal to produce a horizontal drive signal, a vertical drive signal, a horizontal blanking signal and a vertical blanking signal. The horizontal and vertical drive signals are employed to drive the scanning of a raster-scanned cathode ray tube. The horizontal and vertical blanking signals are applied to luminance circuit 79. Luminance circuit 79 separates the luminance signal component from the composite video signal. The blanking signals applied from sync circuit 77 serve to prevent noise generation from the luminance circuit 79 during the horizontal and vertical retrace portions of the raster-scanned cathode ray tube. Lastly, the signal from video buffer amplifier 75 is also applied to chrominance circuit 81 which generates color difference signals G−Y, B−Y and R−Y. The luminance signal and the color difference signals are employed in the present invention in the decoding of the data encoded in the composite video signal.

Figure 7:
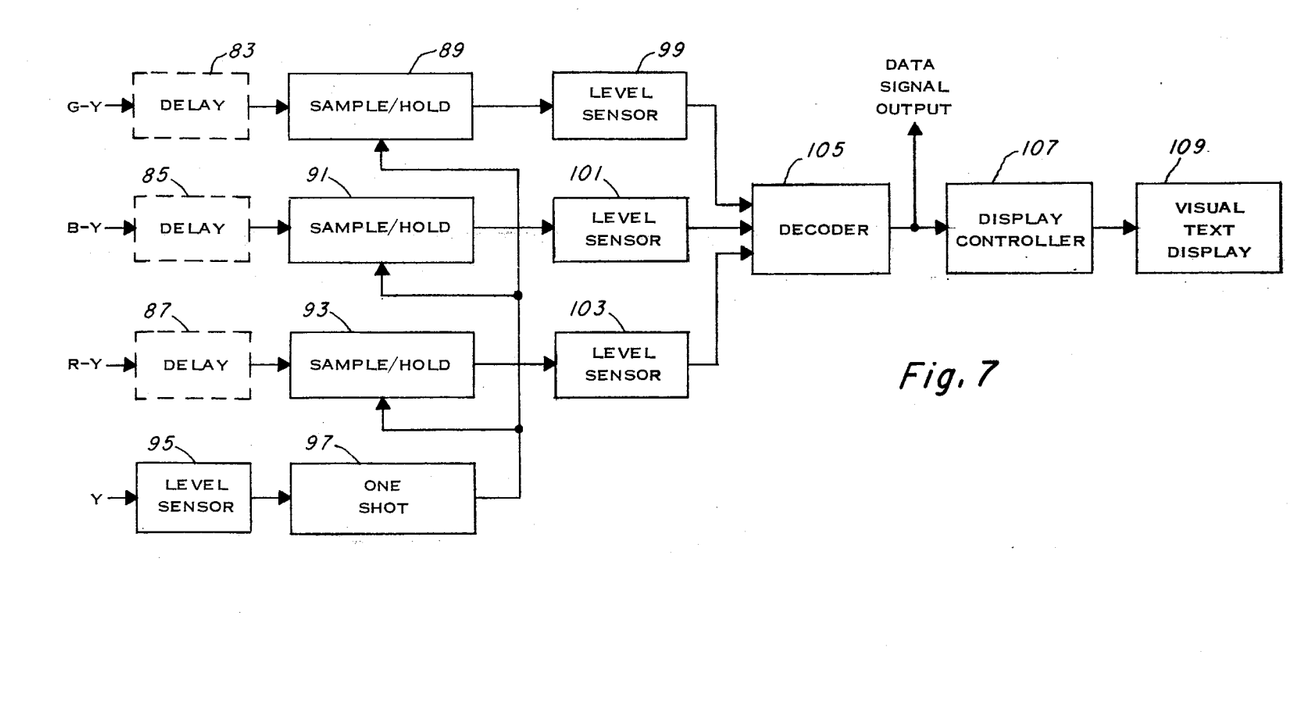
FIG. 7 illustrates an apparatus for decoding digital data encoded according to the present invention and controlling a visual text display.

FIG. 7 illustrates one example of a decoding apparatus according to the present invention. The color difference signal G−Y is applied to delay circuit 83, the color difference signal B−Y is applied to delay circuit 85 and the color difference R−Y is applied to delay circuit 87. As will be explained in further detail below, delay circuits 83, 85 and 87 are optional and their use depends upon the exact nature of the phase relation between the luminance signal from luminance circuit 79 and the color difference signals from chrominance circuit 81. The output of each of these delay circuits is coupled to respective sample and hold circuits 89, 91 and 93. The luminance signal is applied to level sensor 95. Level sensor 95 is adapted to sense the change in the luminance value of the luminance signal from the first brightness level to the second brightness level, which change is of the clocking or timing signal in the encoding scheme. Upon recognition of this change in brightness, level sensor 95 sends a triggering signal to one shot 97. One shot 97 applies a momentary sampling pulse to sample/hold circuits 89, 91 and 93. When triggered by this signal, the sample/hold circuits take a momentary sample of their respective color difference signal inputs and retain this sample for application to the level sensors 99, 101 and 103. It is well known in the art that a particular perceived color has a specific set of color difference signals. The level of these color difference signals is detected by the bank of level sensors 99, 101 and 103 and the results of this detection is applied to decoder 105. Decoder 105 generates a data signal corresponding to the particular color indicated by the color difference signals stored in the sample/hold circuits 89, 91 and 93. This correlation between data and the particular color must be a predetermined relation selected during the encoding process. This data signal is either output as illustrated in FIG. 7 or applied to some utilization device such as display controller 107 and visual text display 109, which together enable production of video text corresponding to the data signal detected.

As mentioned above, provision of delay circuits 83, 85 and 87 is optional, depending upon the particular timing relationship of the luminance signal and the color difference signals. Both the luminance signal and the color difference signals are extracted from the composite video signal by filtering components of the composite video signal in a manner described above in regard to the receiver illustrated in FIG. 6. The luminance signal which is detected by luminance circuit 79 occupies a much wider band width than the chrominance signal which is detected for generation of the color difference signals by the chrominance circuit 81. Therefore, the chrominance circuit 81 includes filter circuits having a narrower band width than the filter circuits of luminance circuit 79. Because of the narrower band width filtering circuits required for chrominance circuit 81, a greater signal time delay is introduced in chrominance circuit 81 than in luminance circuit 79. Depending upon the particular filter circuits employed, the additional delay appearing in chrominance circuit 81 over and above the delay appearing in luminance circuit 79 may be sufficient to insure that the proper portions of the color difference signals are applied to sample/hold circuits 89, 91 and 93 upon detection of the luminance value change without the necessity for the provision of additional delay such as delay circuits 83, 85 and 87. Thus delay circuits 83, 85 and 87 are only necessary if additional delay, beyond the differential delay in the filtering circuits described above, is necessary to insure that the proper portions of the color difference signals before the color switch is applied to the sample/hold circuits when the sampling occurs.

Figure 8:
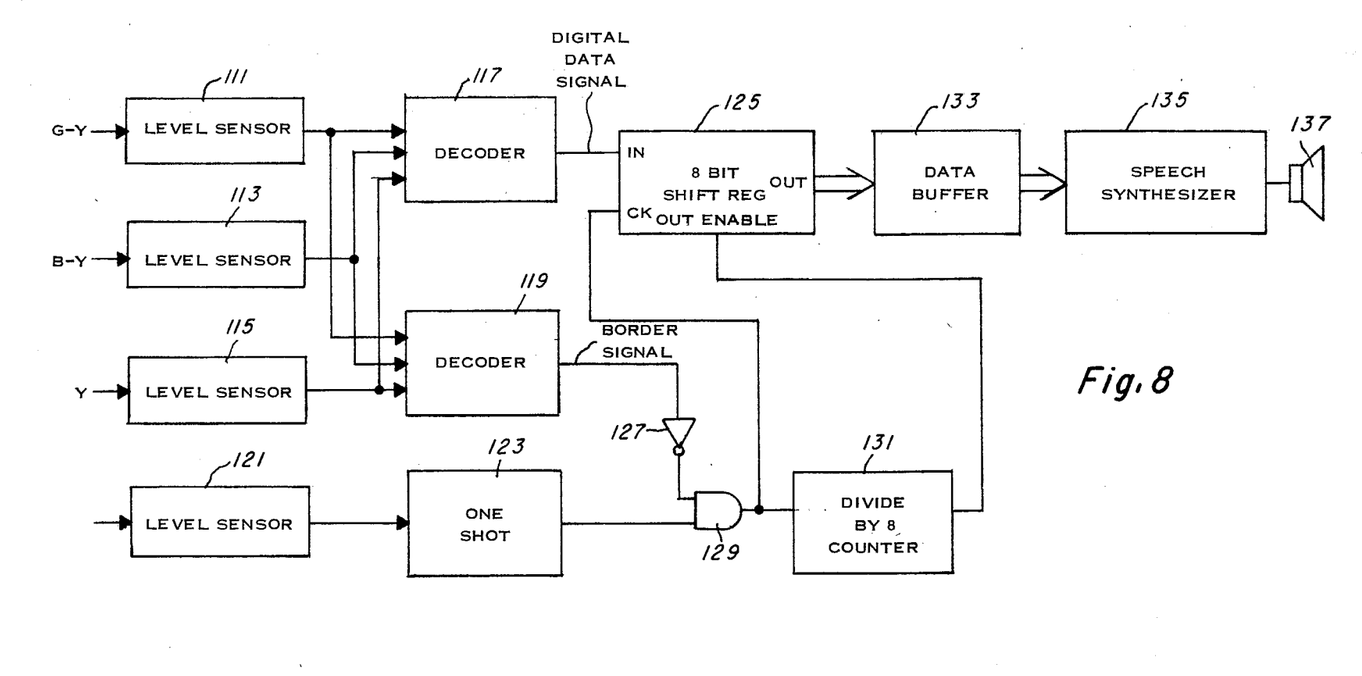
FIG. 8 illustrates an apparatus for decoding digital data encoded according to the present invention and controlling a speech synthesizer.
Figure 9:
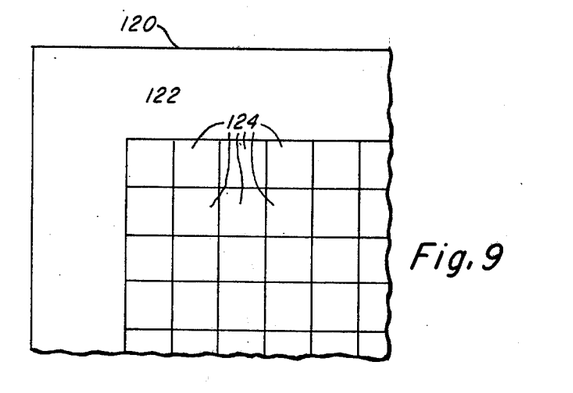
FIG. 9 illustrates a corner portion of a video frame illustrative of a format for the composite video signal according to the present invention.

FIG. 8 illustrates an alternative embodiment for decoding information stored in a video format according to the present invention which suppresses inadvertent false data detection during the horizontal and vertical retrace portions of a particular video frame when used in conjunction with the video frame illustrated in FIG. 9. FIG. 8 illustrates level sensors 111, 113 and 115 receiving the respective green, blue and red difference signals. It is understood that these color difference signals may be applied to the level sensors via delay circuits, such as delay circuits 83, 85 and 87 illustrated in FIG. 7, if necessary to provide the proper timing relationship as explained above. The outputs of level sensors 111, 113 and 115 are applied to both decoder 117 and decoder 119. Decoder 117 performs the same function as the previously described decoder 105. Therefore, decoder 117 generates a digital data signal corresponding to the particular colors indicated by the respective color difference signals. Decoder 119 is constructed to respond to a single predetermined border color and to generate a digital output signal in the "one" state when this particular color is detected. FIG. 9 illustrates the upper left hand corner portion of a video frame 120 such as may be produced by the digital computing system illustrated in FIG. 4. FIG. 9 illustrates that frame 120 is divided into a border portion 122 having a predetermined border color and a plurality of signal pixels 124. Border portion 122 forms a complete ring all around the frame 120, completely surrounding the signal pixels 124. This type of video frame composite video signal can be easily generated by the digital computing system illustrated in FIG. 4 by programming the computing system to insure that those portions of the pattern name table corresponding to pixels within the border region 122 always access a portion of the pattern generator table enabling generation of a solid block of the border color. The color of the signal pixels 124 is made changeable under the control of the data received by the digital computing system. It should be noted that the border color must be different from each of the predetermined colors of signal pixels 124. FIG. 8 illustrates level sensor 121 and one shot 123 which perform the same function as level sensor 95 and one shot 97. The momentary digital signal generated by one shot 123 upon detection of the change in indicated brightness of the luminance signal is applied to AND gate 129. Also applied to AND gate 129 through inverter 127 is the border signal. The output of inverter 127 is a digital "one" when no border signal is detected and a digital "zero" when the border signal is detected. This arrangement has the effect of inhibiting passing of the one shot signal via AND gate 129 during the period in which the predetermined border color is detected. Due to the frame arrangment illustrated in FIG. 9, the border color 122 appears both before and after the horizontal retrace scan and the vertical retrace scan. Thus by providing slight stretching of the border signal output from decoder 119, the decoding apparatus illustrated in FIG. 8 can be inhibited from operation during the horizontal and vertical retrace portions of the video frame. The one shot signal output from AND gate 129 is applied to the clock signal input of 8 bit shift register 125 and divide by 8 counter 131. The clocked input of the digital data signal from decoder 117 into 8 bit shift register 125 and the temporary storage of up to eight bits of data within 8 bit shift register 125 serves much the same function as sample/hold circuits 89, 91 and 93 illustrated in FIG. 7. When eight bits of data have been stored in 8 bit shift register 125, divide by 8 counter 131 produces an output which is applied to an output enable input of 8 bit shift register 125. The application of this signal to the output enable input of shift register 125 causes all 8 bits stored in shift register 125 to be output in parallel to data buffer 133. The data may then be transferred from data buffer 133 to a utilization device such as speech synthesizer 135 and speaker 137 illustrated in FIG. 8. Speech synthesizer 135 could be as described in "Speech Synthesis Integrated Circuit Device", U.S. Pat. No. 4,209,836 by Richard H. Wiggins, Jr. and George L. Brantingham.

FIG. 10 illustrates one example of an 8 element by 8 element signal pixel 124 such as may be employed in the encoding of the present application. This pixel may be one of the characters stored in the pattern generator table employed by the digital computing system illustrated in FIGS. 4 and 5. Note that each line of the pixel has six elements of a first color and two elements of a second color, in this example blue and red. Simultaneous with the transition from the first color to the second color within each line of the pixel is the luminance value change from a first brightness to a second brightness which indicates the timing required for decoding this signal. The first combination of colors, i.e. blue to red, indicates a first state of single digital bit and the second combination of colors, i.e. red to blue, indicates the other state of this binary bit. Each 8×8 pixel such as illustrated in FIG. 10 contains 8 bits of information, therefore a complete listing of all of the possible states of this pixel would include 256 entries. The digital computing system illustrated in FIGS. 4 and 5 could easily store a pattern generator table including data for generation of each of these 256 pixels. The program stored in ROM library module 54 could then enable CPU 12 to translate the data received from the I/O device 26 into the selection of the required pixels. This process would require some data shuffling due to the nature of the pixel form of the control of the generation of the composite video signal in the VDP 60. For the purpose of decoding, it is most convenient for the separate portions of each horizontal scan line to represent adjacent bits of the digital data encoded. However, the system described in conjunction with FIGS. 4 and 5 is especially adapted to control video generation in blocks of 8×8 picture elements. Conversion between these two data forms merely requires temporary storage of the data received until data totaling eight complete horizontal lines is received. Thus, for example, if the VDP 60 were programmed to generate video frames including 24 columns of 8×8 signal pixels, then the upper left hand pixel 124 would include a first line having a color combination indicative of the first bit of received data, a second line indicative of the 25th bit of received data, a third line indicative of the 49th bit of received data, and so forth. Thus each of the signal pixels 124 generated by VDP 60 would include data bits occurring at intervals within the received data equal to the number of columns of signal pixels. Digital data encoded in the format illustrated by the example pixel of FIG. 10 could be decoded by either the apparatus illustrated in FIG. 7 or that illustrated in FIG. 8.

FIG. 11 illustrates another example of an 8×8 pixel such as could be generated by the digital computing system illustrated in FIGS. 4 and 5 having a higher data density than the pixel illustrated in FIG. 10. Note that each line of the 8×8 pixel is divided into four sections, a first three picture element section, a second one picture element section, a third three element section and a fourth one picture element section. By thus dividing the eight picture element lines of each pixel, two color changes can be transmitted for each eight picture element line as opposed to the single color transition transmitted in the eight element line illustrated in FIG. 10. It is to be understood that a luminance value change from a first brightness to a second brightness is to occur at both the change in color from the first section to the second section and at the change in color from the third section to the fourth section. Also please note that there are now four different colors enabling four different color transitions. For example, a transition from cyan to yellow could represent a two bit signal "00". Similarly, a red to blue transition could indicate the two bit signal "01", a yellow to cyan transition could represent "10", and lastly a blue to red transition could represent "11". In this manner each color transition represents one of four possible color transitions and thus two bits of digital information. By having each transition representative of two bits of digital information and having two such transitions per line instead of the one transition per line of the pixel illustrated in FIG. 10, the pixel illustrated in FIG. 11 contains four times the data density of the pixel illustrated in FIG. 10. Because now there are 232 different such pixels as illustrated in FIG. 11, it would not be practical to have the computing system illustrated in FIG. 4 store each possible 32 bit pixel and select this pixel depending upon the incoming digital data. Rather, it would be more advantageous to construct the pattern generator table for the specific pixels required after the digital data has been received and the particular pixels required identified. Thus the pattern generator table would not require more pattern generator information than is required to generate the maximum number of pixels included within frame 120, and this table may include pattern generation information for fewer pixels if some of these pixels are repeated.

Figure 12:
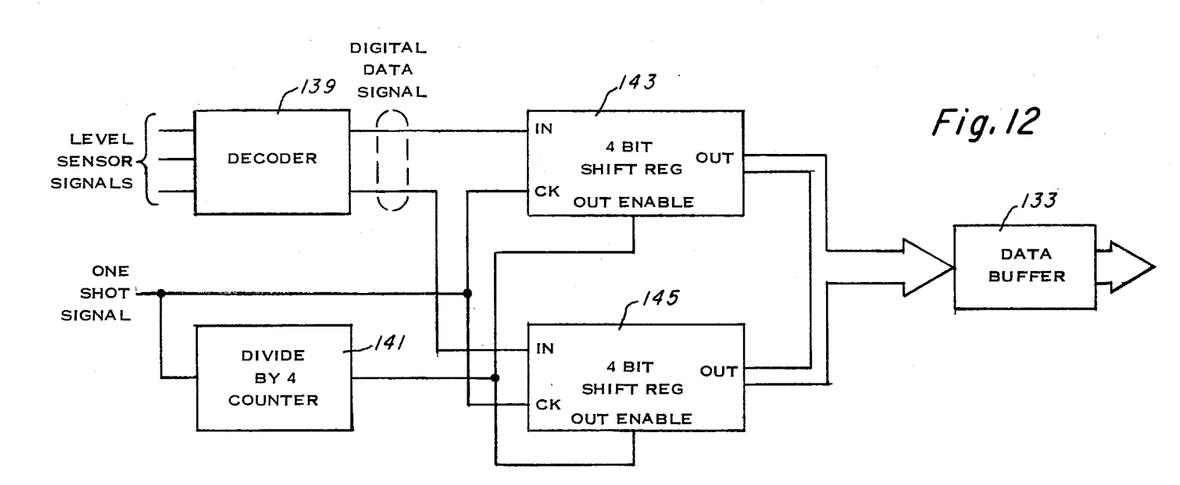
FIG. 12 illustrates modifications of the apparatus illustrated in FIG. 8 in order to employ the encoded pixel form illustrated in FIG. 11.

FIG. 12 illustrates some structure which may be substituted for decoder 117, 8 bit shift register 125 and divide by 8 counter 131 for decoding pixels encoded in the form illustrated in FIG. 11. Decoder 139 receives the signals from the level sensors 111, 113 and 115 in the same manner as decoder 117. Decoder 139 differs from decoder 117 because decoder 139 must recognize each of the four colors appearing in the pixel illustrated in FIG. 11. Upon recognition of any of these four colors, decoder 139 generates a two bit digital data signal. This two bit signal is indicative of the two bits of data represented by each color transition of pixel 124 illustrated in FIG. 11. One bit of the digital data signal is applied to the input of four bit shift register 143 and the other bit of the digital data signal is applied to the input of four bit shift register 145. The one shot signal from the output of AND gate 129 illustrated in FIG. 8 is then applied to the clock input of both four bit shift registers 143 and 145. Thus the two bits of digital data signal from decoder 139 are entered into shift registers 143 and 145 in a manner analagous to entry into eight bit shift register 125. The one shot signal from AND gate 129 is also applied to a divide by four counter 141. The divide by four counter 141 applies an output signal to output enable inputs of both four bit shift registers 143 and 144. Upon receipt of this signal, the eight bits stored in four bit shift register 143 and four bit shift register 145 are simultaneously output in parallel into data buffer 133. This is similar to the shift of the eight bits stored in eight bit shift register 125 into data buffer 133 illustrated in FIG. 8. It is to be understood that this particular decoding scheme is not required for the four color pixel illustrated in FIG. 11, but that it merely represents an example of one method of decoding such a four color pixel. In addition, it should be clearly understood that more than four colors may be employed so long as both the encoding and decoding apparatus can readily distinguish between each of the plurality of colors selected, and that for each change in colors representative of the digital data encoded there must be a simultaneous change in brightness conveying the timing information for the decoder.

I claim:

1. A method for encoding digital data into a video format having a luminance signal and a chrominance signal, the method comprising the steps of:
generating a first chrominance value, the first chrominance value being a selected one of a predetermined set of chrominance values which corresponds to digital data to be encoded;
generating a second chrominance value, the second chrominance value being another one of the predetermined set of chrominance values different from the first chrominance value;
generating a chrominance signal having the first chrominance value for a first period of time and the second chrominance value for a second period of time immediately following the first period; and
generating a luminance signal having a first predetermined luminance value for the first period and a second predetermined luminance value for the second period.

2. The method as claimed in claim 1, wherein:
the step of generating the first chrominance value comprises generating a selected one of two predetermined chrominance values corresponding to the state of one bit of the digital data to be encoded; and
the step of generating the second chrominance value comprises generating the other of the two predetermined chrominance values.

3. The method as claim in claim 1, wherein:
the step of generating the first chrominance value comprises generating a selected one of 2 N predetermined chrominance values corresponding to the combined state of N bits of data to be encoded, where N is a positive integer; and
the step of generating the second chrominance value comprises generating a selected other one of the 2 N predetermined chrominance values.

4. The method as claimed in claim 1, further comprising the step of:
generating a composite video signal including the luminance signal and the chrominance signal.

5. The method as claimed in claim 4, further comprising the step of:
transmitting the composite video signal via a video transmission medium.

6. The method as claimed in claim 4, further comprising the step of:
storing the composite video signal in a video storage medium.

7. The method as claimed in claim 6, further comprising the step of:
transmitting the stored composite video signal via a video transmission medium.

8. The method as claimed in claim 4, wherein the step of generating a composite video signal comprises generating at least one video frame comprising a border region adjacent to the entire border of the video frame having a chrominance signal with a predetermined border chrominance value and a signal region encircled by the border region having the generated luminance signal and the generated chrominance signal.

9. A method for decoding digital data encoded in a video format having a luminance signal and a chrominance signal, the method comprising the steps of:
detecting the luminance value of the luminance signal;
detecting the point in time when the luminance value changes from a first predetermined luminance value to a second predetermined luminance value;
detecting the chrominance value of the chrominance signal immediately prior to the detected point in time; and
generating a digital data signal corresponding to the detected chrominance value.

10. The method as claimed in claim 9 wherein:
the step of generating a digital data signal comprises generating a binary bit having a first state when the detected chrominance value equals a first predetermined chrominance value and generating a binary bit having a second state when the detected chrominance value equals a second predetermined chrominance value.

11. The method as claimed in claim 9 wherein:

the step of generating a digital data signal comprises generating N binary bits having a combined state corresponding to a selected one of 2 N predetermined chrominance values when the detected chrominance value equals the selected one of 2 N predetermined chrominance values, where N is a positive integer.

12. The method as claimed in claim 9, further comprising the steps of:
receiving a composite video signal;
generating the luminance signal by separating the luminance signal component from the received composite video signal; and
generating the chrominance signal by separating the chrominance signal component from the received composite video signal.

13. The method as claimed in claim 12, further comprising the steps of:
detecting whether the separate chrominance signal has a predetermined border chrominance value; and
inhibiting the generation of the digital data signal when the predetermined border chrominance value is detected.

14. The method as claimed in claim 9, wherein the digital data encoded in video format comprises digital character data for generating visual text, further comprising the step of:
providing a visually preceivable textual display corresponding to the digital data signal.

15. The method as claimed in claim 9, wherein the digital data encoded in video format comprises digital speech data for generating synthetic speech, further comprising the step of:
converting the digital data signal into one or more words of human speech.

16. A method for communicating digital data encoded into a video format having a luminance signal and a chrominance signal, the method comprising the steps of:
generating a first chrominance value, the first chrominance value being a selected one of a predetermined set of chrominance values which corresponds to digital data to be encoded;
generating a second chrominance value, the second chrominance value being another one of the predetermined set of chrominance values different from the first chrominance value;
generating a chrominance signal having the first chrominance value for a first period of time and the second chrominance value for a second period of time immediately following the first period;
generating a luminance signal having a first predetermined luminance value for the first period and a second predetermined luminance value for the second period;
generating a composite video signal including the luminance signal and the chrominance signal;
transmitting the composite video signal via a video transmission medium;
receiving the transmitted composite video signal from the video transmission medium;
separating the luminance signal component from the received composite video signal;
detecting the luminance value of the separated luminance signal;
detecting the point in time during which the luminance value of the separated luminance signal changes from the first predetermined luminance value to the second predetermined luminance value;
separating the chrominance signal component from the received composite video signal;
detecting the chrominance value of the separated chrominance signal immediately prior to the detected point in time; and
generating a digital data signal corresponding to the detected one of the predetermined set of chrominance values.

17. The method as claimed in claim 16, further comprising the steps of:
storing the transmitted video composite signal in a video storage medium;
retransmitting the stored video composite signal from the video storage medium via a video transmission medium; and
wherein the step of receiving the transmitted composite video signal comprises receiving the retransmitted composite video signal.

18. An apparatus for encoding digital data into a video format having a luminance signal and a chrominance signal, the apparatus comprising:
means responsive to the digital data to be encoded for generating first and second chrominance values, the first chrominance value being one of a predetermined set of chrominance values and corresponding to the digital data to be encoded, and the second chrominance value being another of the predetermined set of chrominance values;
means for generating a chrominance signal having the first chrominance value for a first period of time and the second chrominance value for a second period of time immediately following the first period of time; and
means for generating a luminance signal having a first predetermined luminance value for the first period of time and a second predetermined luminance value for the second period of time.

19. The apparatus as claimed in claim 18, further comprising:
means responsive to the luminance signal and the chrominance signal for generating a composite video signal therefrom.

20. The apparatus as claimed in claim 19, further comprising:
means for transmitting the composite video signal on a video transmission medium.

21. The apparatus as claimed in claim 19, further comprising:
means for storing the composite video signal therein.

22. The apparatus as claimed in claim 19, wherein:
the composite video signal generating means comprises means for generating at least one video frame comprising a border region adjacent to the entire border of the video frame having a chrominance signal with a predetermined border chrominance value and a signal region encircled by the border region having the generated luminance signal and the generated chrominance signal.

23. An apparatus for decoding digital data encoded into a video format having a luminance signal and a chrominance signal, the apparatus comprising:
means for detecting the luminance value of the luminance signal;
means for detecting the point in time when the luminance value changes from a first predetermined luminance value to a second predetermined luminance value;

means for detecting the chrominance value of the chrominance signal immediately prior to the detected point in time; and means for generating a digital data signal corresponding to the detected chrominance value.

24. The apparatus as claimed in claim 23, further comprising:

means for receiving a composite video signal;

means for separating the luminance signal component from the composite video signal, thereby generating the luminance signal; and means for separating the chrominance signal component from the composite video signal, thereby generating the luminance signal.

25. The apparatus claimed in claim 24, further comprising:

means responsive to the detected luminance signal for detecting when the detected luminance signal has a predetermined border chrominance value; and means for inhibiting the generation of the digital data signal when the border chrominance value is detected.

26. The apparatus as claimed in claim 23, wherein the digital data encoded in video format comprises digital character data for generating visual text, further comprising:

means for providing a visually perceivable textual display corresponding to the digital data signal.

27. The apparatus as claimed in claim 23, wherein the digital data encoder in video format comprises digital speech data for generating synthetic speech, further comprising:

means for converting the digital data signal into one or more words of human language.

* * * * *